(12) United States Patent
Frielinghaus

(10) Patent No.: US 10,925,439 B2
(45) Date of Patent: Feb. 23, 2021

(54) ATTACHABLE CONTAINER FOR A FOOD PROCESSOR AND METHOD FOR OPERATING A FOOD PROCESSOR

(71) Applicant: Vorwerk & Co. Interholding GmbH, Wuppertal (DE)

(72) Inventor: Robert Frielinghaus, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 311 days.

(21) Appl. No.: 16/012,313

(22) Filed: Jun. 19, 2018

(65) Prior Publication Data

US 2019/0000274 A1 Jan. 3, 2019

(30) Foreign Application Priority Data

Jun. 28, 2017 (DE) ..................... 10 2017 114 409.9

(51) Int. Cl.
| | | |
|---|---|---|
| *A47J 43/00* | (2006.01) | |
| *A47J 43/07* | (2006.01) | |
| *A47J 44/00* | (2006.01) | |
| *A47J 27/13* | (2006.01) | |
| *A47J 27/00* | (2006.01) | |
| *A47J 43/046* | (2006.01) | |
| *B65D 21/02* | (2006.01) | |

(52) U.S. Cl.
CPC ......... *A47J 43/0727* (2013.01); *A47J 27/004* (2013.01); *A47J 27/13* (2013.01); *A47J 43/046* (2013.01); *A47J 43/0716* (2013.01); *A47J 44/00* (2013.01); *B65D 21/0212* (2013.01)

(58) Field of Classification Search
CPC ...... A47J 43/046; A47J 43/0727; A47J 27/12; A47J 27/13; A47J 27/004; A47J 43/0716; A47J 44/00; B65D 21/0212
See application file for complete search history.

(56) References Cited

U.S. PATENT DOCUMENTS

2006/0263501 A1 11/2006 Oghafua et al.

FOREIGN PATENT DOCUMENTS

| DE | 10 2012 100 940 A1 | 8/2013 | |
|---|---|---|---|
| WO | WO-2014201509 A2 * | 12/2014 | ............... A47J 44/00 |

* cited by examiner

*Primary Examiner* — Anshu Bhatia
(74) *Attorney, Agent, or Firm* — Collard & Roe, P.C.

(57) ABSTRACT

The invention relates to an attachable container (3, 4, 5) for placement onto a preparation vessel (2) of a food processor (1), wherein a floor-side opening (12) of the attachable container (3, 4, 5) lies vertically above an upper opening (7) of the preparation vessel (2). Closure means (13) are provided, which close the floor-side opening (12) in a closed position and can be moved to an open position so as to fill ingredients (23, 24) stored in the attachable container (2) into the preparation vessel (3, 4, 5). A food processor having one or several of such attachable containers (3, 4, 5) enables an automatic preparation of a meal with readily perishable foods.

10 Claims, 5 Drawing Sheets

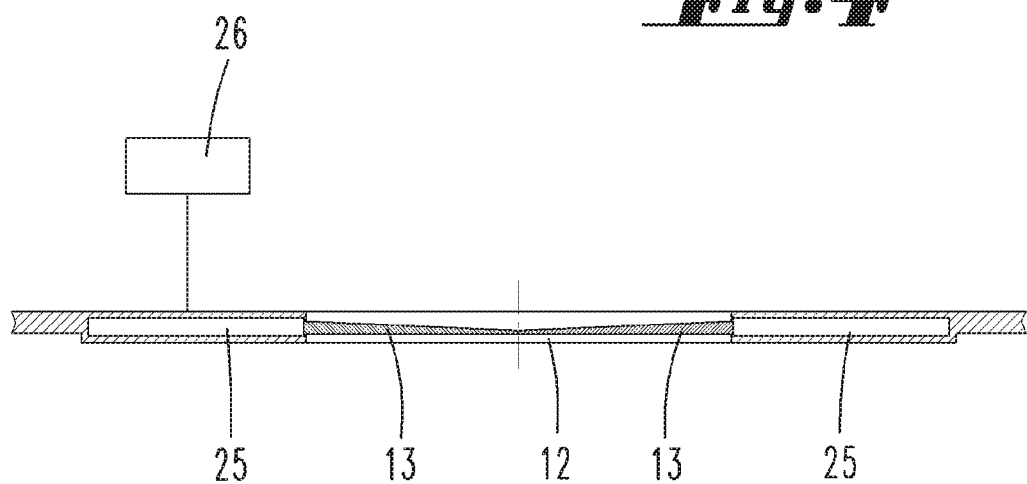

ATTACHABLE CONTAINER FOR A FOOD PROCESSOR AND METHOD FOR OPERATING A FOOD PROCESSOR

CROSS REFERENCE TO RELATED APPLICATIONS

Applicant claims priority under 35 U.S.C. § 119 of German Application No. 10 2017 114 409.9 filed on Jun. 28, 2017, the disclosure of which is incorporated by reference.

AREA OF TECHNOLOGY

The invention relates to a device in the form of an attachable container for placement onto a preparation vessel of a food processor, wherein a floor-side opening of the attachable container lies vertically above an upper opening of the preparation vessel.

The invention further relates to a food processor having at least one such attachable container.

The invention further relates to a method for operating a food processor.

PRIOR ART

A generic food processor with a generic attachable container is described in DE 10 2012 100 940 A1. A cooking pot that is used for preparing meals, and thus comprises a preparation vessel, has an upper opening through which steam can enter into an attachable container arranged above the upper opening, so as to thereby steam cook meals provided in the attachable container.

Known from US 2006/0263501 A1 is an attachable container for a food processor that is designed with only a partially continuous floor, and with respect to the opening always provided in the floor can be displaced into a superposed position relative to the preparation vessel by means of a rotary drive, so that the added ingredients located in the attachable container can fall into the preparation vessel.

SUMMARY OF THE INVENTION

In terms of the prior art described above, one technical problem with the invention is regarded as increasing the scope of application for the food processor, and in particular improving the food processor from a handling standpoint.

In a first inventive idea, a possible solution to the object lies in further developing the attachable container so as to provide closure means, which are formed in the attachable container itself and otherwise movable relative to the attachable container, and which close the floor-side opening in a closed position and can be moved to an open position so as to fill ingredients stored in the attachable container into the preparation vessel. In the closed position, the closure means close the floor-side opening. In the open position, the floor-side opening is open. As a result, the attachable container according to the invention is able to store ingredients for food preparation, which are brought into the preparation vessel at a prescribed time in the preparation process. To this end, the closure means must be brought from the closed position into the open position, so that the ingredients, in particular exposed to gravity, can then fall through the floor-side opening, which is then open, in the floor of the attachable container, and through the upper opening of the preparation vessel into the preparation vessel.

The floor-side opening can have a large enough cross section to empty the attachable container. In addition, the floor of the attachable container can have a specific funnel shape, so that even ingredients close to the edge of the floor fall through the open floor opening of the attachable container.

A further development of the invention provides that the closure means can be electromechanically activated. In particular electromechanical drive means are provided for this purpose, so as to move the closure means from the closed position to the open position. This further development makes it possible to automatically fill the ingredients from the attachable container into the preparation vessel.

In particular, it is provided that the drive element receive switching signals from a controller that controls a cooking process, which prompt the controller to activate the drive element so as to displace the closure means from the closed position to the open position.

The closure means can be sliders that can be displaceable in a floor plane. These can be arranged like a kind of iris diaphragm.

The attachable container can have a circular layout. In particular, it has a cylindrical side wall. The side wall can have a cavity. The side wall can be temperature-controlled with temperature control means. In particular, temperature control means are arranged in the cavity. The temperature control means can be cooling elements, which cool ingredients stored in the attachable container. However, heating means are also conceivable.

A power supply is provided with which the attachable container can be supplied with electrical power. An accumulator can be provided for this purpose, for example which is arranged in a housing cavity. However, power can also be supplied via a supply cable, in which electrical power is fed from the food processor.

The controller can locally be allocated to the food processor. A program-controlled controller is preferably involved. The controller is able to generate control signals, which are fed to the attachable container via a signal connection. This process can be wireless or hardwired.

A lowermost attachable container can be provided, which is placed directly on the preparation vessel. If necessary, the lowermost attachable container can also be placed on a cover of the preparation vessel, wherein the cover has an opening arranged under the floor-side opening of the attachable container.

However, it is also provided that the lowermost attachable container rests directly on an upper edge of the upper opening of the preparation vessel, and in a sense form the cover of the preparation vessel.

A further development of the invention provides that at least one upper attachable container or several additional attachable containers stacked one on top of the other be arranged on the lowermost attachable container. In such an arrangement, various ingredients can be stored in the individual attachable containers, which are sequentially brought into the preparation vessel at a respectively specific time during meal preparation.

The attachable containers are essentially identical in structural design, wherein it can be provided that only the lowermost attachable container have a cable with a plug, which is inserted into a plug opening of the food processor, so as to supply the attachable container with power and transmit control signals.

The upper edge of the attachable container can have an interface element, which interacts with a counter-interface element arranged at the lower edge of an upper attachable container. Signals and/or electrical power can be transmitted via the interconnected interface elements.

However, wireless signal transmission is also provided as an alternative to hardwired signal transmission. For example, this can take place via the Bluetooth protocol. Given a cable connection, the plug or interface elements can be designed according to the USB standard.

It is further possible to provide a cover, with which an upper opening of the attachable container can be closed. In addition, mechanical connecting means can be provided, with which attachable containers stacked one on top of the other can be mechanically interconnected. The mechanical connecting means can have snap-fits, which can engage into hooked recesses.

The method according to the invention enables the automatic preparation of meals, in which various ingredients are introduced into the preparation vessel one after the other in chronological sequence at defined times. For example, a first ingredient is brought into the preparation vessel right at the start of the cooking process, and there cooked, which can be done using a heater of the preparation vessel, but also an agitator arranged on the floor of the preparation vessel.

Provided are one or several preparation vessels, which each are filled with an ingredient, and which are placed or stacked on the preparation vessel with closure means located in the closed position. The cooking process begins with a thermal and/or mechanical treatment of the ingredient stored in the preparation vessel at the beginning. After a first period has elapsed since the cooking process began, the controller opens the closure means of a lowermost attachable container, so that the ingredient contained therein can fall into the preparation vessel. At a second point in time after the cooking process began, the closure means of an attachable container arranged above the lowermost attachable container are opened, so that the ingredient contained therein can fall through the lowermost attachable container and its open opening and into the preparation vessel.

Additional attachable containers each containing various ingredients can be arranged one above the other, wherein the closure elements of the attachable containers arranged one above the other can be sequentially opened from the bottom up.

According to the invention, several containers that can be stacked one on top of the other are placed on the vessel of the food processor. Each container is equipped with a floor to be automatically opened, and filled with an individual ingredient. The containers can optionally be cooled for perishable foods. They have a power supply and communications interface with the food processor, and are supplied and controlled by the food processor.

The containers open their floors one after the other, so as to add the ingredient provided for the recipe step into the container of the food processor. The latter falls through all underlying container planes until into the container of the food processor. The container floors can be opened automatically. However, it is also provided that control elements, e.g., a touch-sensitive display, be furnished for this purpose. The display can also indicate the ingredient contained in the container.

The device according to the invention makes it possible to prepare the cooking process hours before the time of preparation, and to program the food processor in such a way that the meal is completely cooked by a prescribed point in time. Because the attachable containers can be cooled, readily perishable foods can also be contained therein for a longer time.

BRIEF DESCRIPTION OF THE DRAWINGS

An exemplary embodiment will be explained below based on attached drawings. Shown on:

FIG. 4 is a schematic view, in which the closure means 13 assume a closed position, and thereby close the floor-side opening 12, FIG. 5 is a view according to FIG. 4, wherein the closure means 13 are in an open position, so that the floor-side opening 12 is released.

DESCRIPTION OF THE EMBODIMENTS

Figure 1:
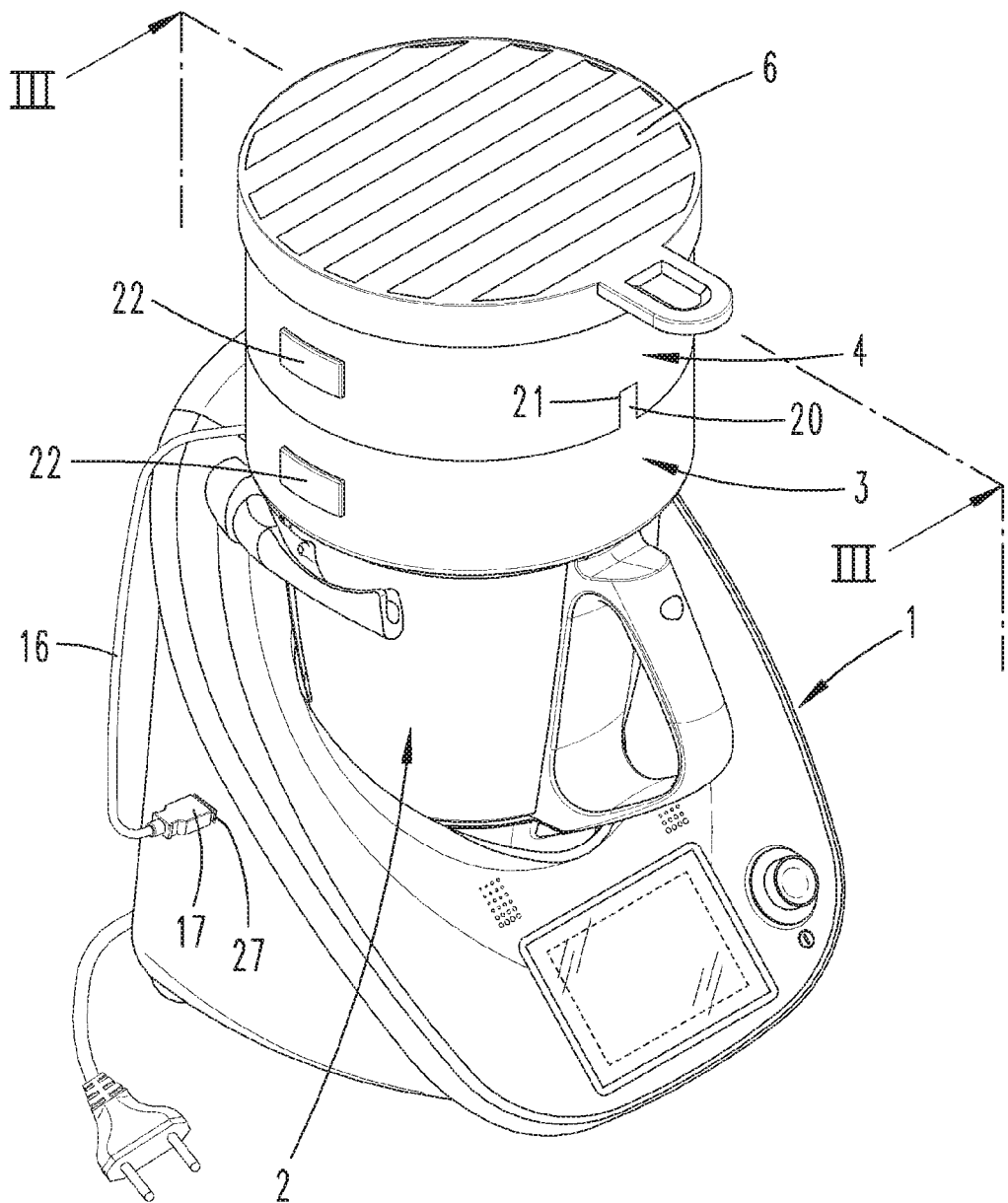
FIG. 1 is a perspective view of a food processor 1, whose preparation vessel 2 has arranged on it two attachable containers 3, 4 one above the other, wherein a cover 6 rests on the uppermost attachable container 4.
Figure 2:
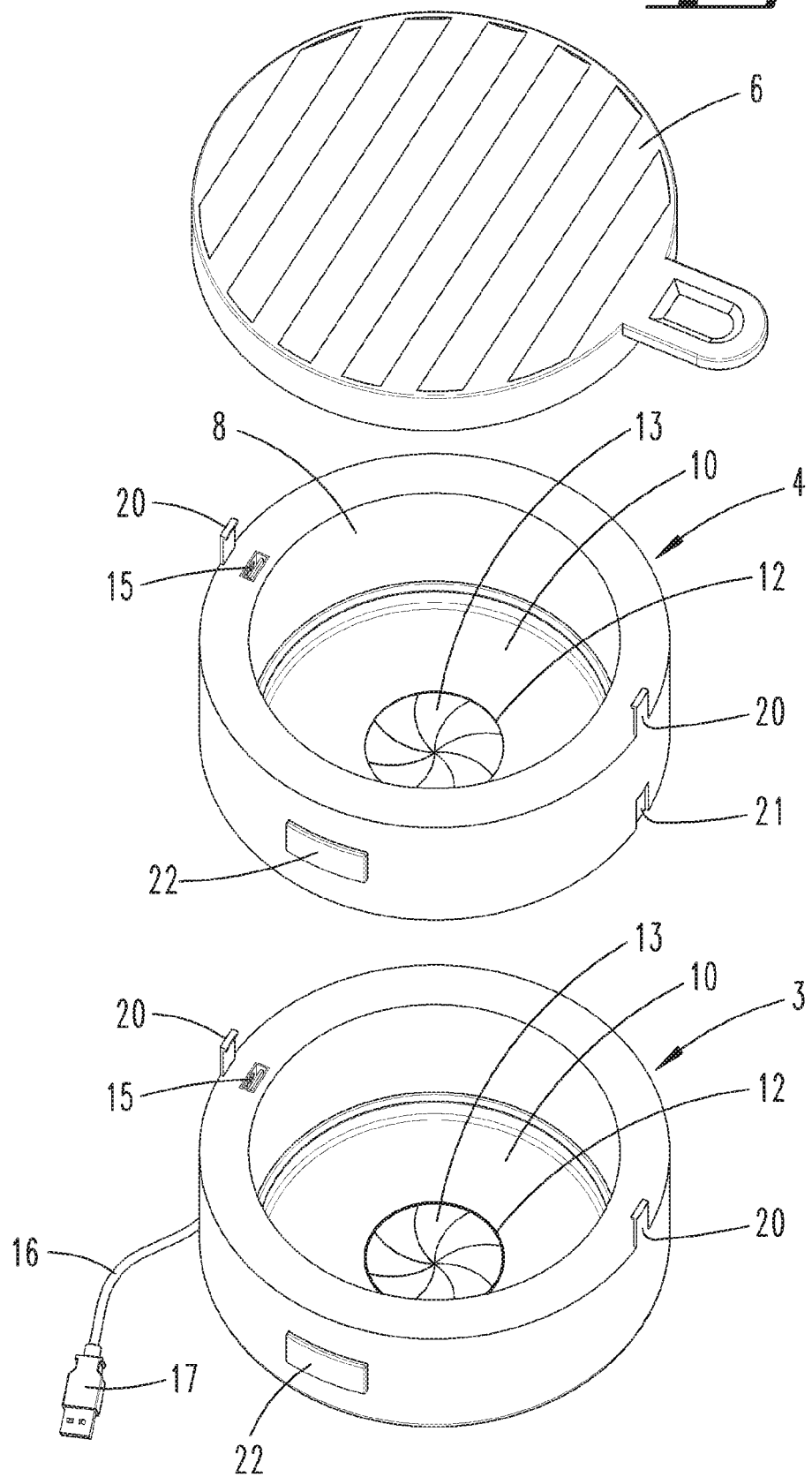
FIG. 2 is a perspective, exploded view of the two attachable containers 3, 4 with cover 6.
Figure 3:
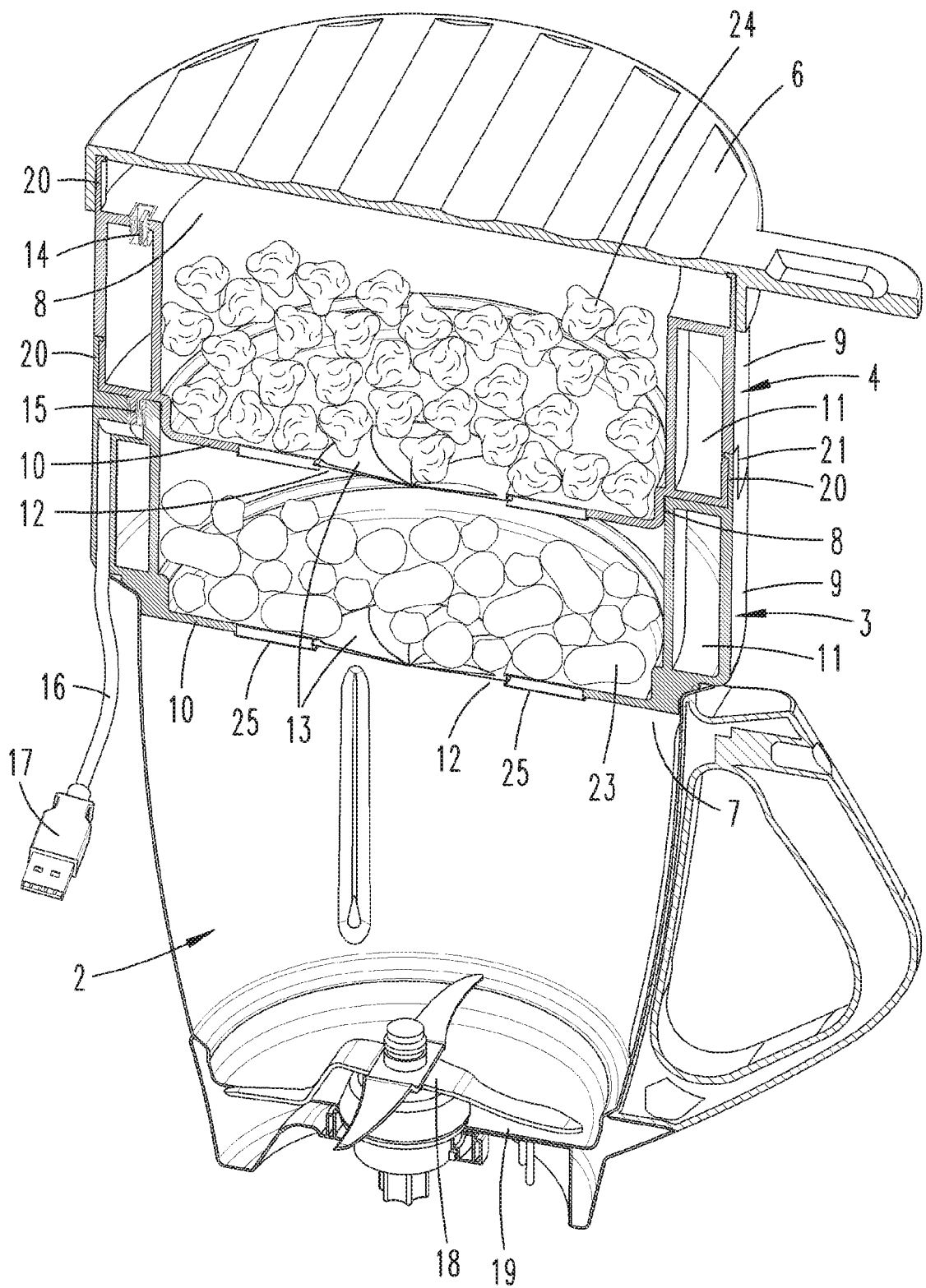
FIG. 3 is a sectional view of the two attachable containers 3, 4 placed on the preparation vessel 2, which each are filled with a different ingredient 23, 24, wherein a respective floor-side opening 12 of the attachment containers 3, 4 is closed by closure means 13.

Initially shown and described is a food processor 1, which has a housing that incorporates an electric drive motor, which can be used to rotationally drive an agitator 18, wherein the agitator 18 is allocated to the floor 19 of a preparation vessel 2 that has an upper opening 7.

Also provided in the housing of the food processor 1 is an electrical circuit, and in particular a controller having a microcontroller, which enables a programmed control of a cooking process.

Provided for executing the cooking process are heating means, so as to heat the preparation vessel 2 with the ingredients contained therein. An insertion opening 27 is provided for inserting a plug 17. The plug 17 and insertion opening 27 can be configured according to the USB standard or some other suitable standard. A cable 16 connected with the plug 17 can transmit power to an attachable container 3. However, electrical signals can also be transmitted via the cable 16. In particular, control signals are transmitted via the cable 16.

However, wireless signal transmission is also conceivable in place of a hardwired signal transmission.

Located above the upper opening 7 of the preparation vessel 2 in the exemplary embodiment are several attachable containers 3, 4, 5, wherein the attachable containers 3, 4, 5 are essentially identical in design, and in particular have an identical layout.

The attachable containers 3, 4, 5 essentially differ in that the lowermost attachable container 3 placed directly on the upper opening 7 of the preparation vessel has the cable 16, while the attachable containers 4, 5 that can be placed on the lowermost attachable container 3 have an interface element 15 on their lower side that can be brought into contact with an interface element 14 arranged on the upper side of the attachable container 3, 4, 5. Electrical control signals can be transmitted via the interface elements 14, 15. However, electrical power can also be transmitted via the interface elements 14, 15. A configuration according to the USB standard is provided here as well. The interface elements 14, 15 can be electrical plug elements designed according to the respective standard, wherein contacts establish a conductive connection when an attachable container 4, 5 is placed on an attachable container 3, 4 lying thereunder.

The attachable containers 3, 4, 5 made out of plastic or metal, for example, have a floor 10 that is essentially shown to be flat in the drawings. However, the floor 10 can also be slightly inclined. In particular, it can be funnel-shaped. Located in the middle of the floor 10 is a floor-side opening 12, to which are allocated closure means 13 belonging to the attachable container 3, 4, 5 itself. The attachable container 3, 4, 5 can thus be arranged with a closed floor-side opening 12 and, if required, also be transported or displaced. The closure means 13 of the respective attachable container 3, 4, 5 itself can then be moved from a closed position, in which they close the floor-side opening 12, to an open position, in which the floor-side opening 12 is open. The attachable container 3, 4, 5 itself thus has closure means that are always present in the attachable container 3, 4, 5, and present on the latter regardless of its respective position, even if it is filled outside of the food processor, for example.

Drive elements 25, in particular electromechanical drive elements, can be provided for moving the closure means 13 from the closed position into the open position, and in particular from the open position back into the closed position. The drive elements 25 are preferably also always part of an attachable container 3, 4, 5, i.e., are also displaced and entrained together with the attachable container during transport. The closure means 13 can consist of sliders. In particular, it is provided that the sliders of the closure means 13 be designed like an iris diaphragm.

The drive element 25 shown only schematically and not in detail in the drawings receives control signals from the also just schematically shown controller 26, which is provided in particular in the food processor 1. The control signals are transmitted via the cable 16 or interface elements 14, 15.

The attachable container 3, 4, 5 possesses an essentially cylindrical side wall 9, which has a cavity 11. The cavity can incorporate a temperature-control device, which in particular is a heater and/or cooler, which can be used to temperature-control, in particular cool or heat, the ingredients 23, 24 contained in the attachable container 3, 4, 5.

Each attachable container 3, 4, 5 has a receiving cavity, which is bordered by the side walls and floor 10. The receiving cavity is open at the top. The attachable container 3, 4, 5 there has an upper opening 8.

The upper opening 8 can be closed by an additional attachable container 3, 4, 5 placed thereupon. The upper opening 8 is then closed by the floor 10 of an additional attachable container 4, 5. An uppermost attachable container 5 can here carry a cover that closes its upper opening 8.

Mechanical connecting means 20, 21 are provided, which tie together the attachable containers 3, 4, 5 stacked one on top of the other. In the exemplary embodiment, a connecting element that protrudes over the upper edge 8 of the attachable container 3 is designed as a spring tab with a latching element, which engages into a latching recess in the connecting element 21, wherein the connecting element 21 is arranged on the underside of an attachable container 4, 5.

A display element 22 can be arranged on the outside of the side wall of the attachable container 3, 4, 5, so as to indicate the operating state of the attachable container 3, 4, 5.

A method for preparing meals or operating a food processor 1 with attachable containers 3, 4, 5 of the kind depicted in the drawings can involve the following steps: A first ingredient is initially filled into the preparation vessel 2. An ingredient 23, 24 is likewise filled into at least one attachable container 3, 4, 5. The at least one attachable container 3, 4, 5 is then arranged above the upper opening 7 of the preparation vessel 2. Connecting means can be provided here as well, which connect the lowermost attachable container 3 with the preparation vessel 2 or a cover placed on the preparation vessel 2 and not shown in the drawings, wherein the cover has an opening arranged under the floor-side opening 12 of the lowermost attachable container 3.

In a variant of the method, several attachable containers 3, 4, 5 are arranged one above the other, wherein a different ingredient 23, 24 is stored in each attachable container 3, 4, 5. The lower openings 12 of the attachable containers 3, 4, 5 lie vertically above each other and vertically above the upper opening 7 of the preparation vessel 2, so that the ingredients 23, 24 can fall into the preparation vessel 2 solely through exposure to gravity.

When the cooking process begins, the ingredient contained in the preparation vessel 2 is initially precooked. However, it is also possible to only mechanically process the ingredient there with the agitator 18 in a first step.

After the first cooking step has ended, the opening 12 of the attachable container 3 arranged directly above the preparation vessel 2 is open. To this end, the drive elements 25 receive a control signal from the controller 26. The ingredients 23 arranged in the lowermost attachable container 3 then fall through the open floor-side opening 12 into the preparation vessel 2, where the cooking process is continued.

The floor-side openings 12 of the overlying attachable container 4, 5 remains closed. The floor-side opening 12 in the lowermost attachable container 3 can be closed again, but can also remain open.

At a predetermined second point in time, the floor-side opening 12 of the attachable container 4 is open, and arranged above the attachable container 3. Should the floor-side opening 12 of the attachable container 3 again have been closed, this opening 12 is also opened, so that the ingredients 24 can fall out of the attachable container 4 through the openings 12 of both attachable containers 3, 4 and into the preparation vessel 2.

Figure 6:
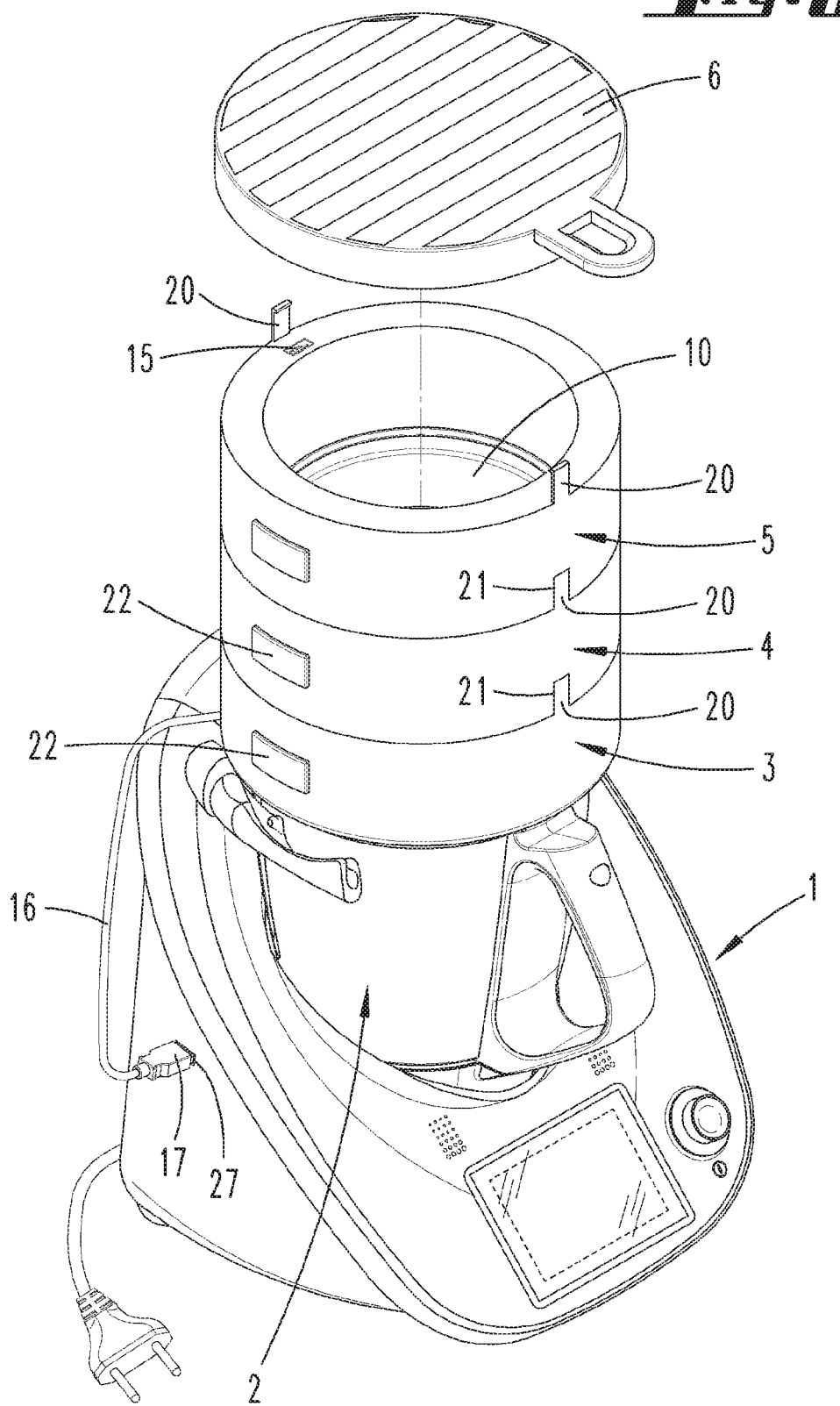
FIG. 6 is a view according to FIG. 1, wherein a total of three attachable containers 3, 4, 5 are arranged above the preparation vessel 2.

If additional attachable containers 5 are provided as depicted on FIG. 6, the step is repeated analogously.

REFERENCE LIST

1 Food processor
2 Preparation vessel
3 Attachable container
4 Attachable container
5 Attachable container
6 Cover
7 Upper opening
8 Upper opening
9 Wall
10 Floor
11 Cavity
12 Opening
13 Closure means
14 Interface element
15 Interface element
16 Cable
17 Plug
18 Agitator
19 Floor
20 Connecting means
21 Connecting means
22 Display element
23 Ingredient
24 Ingredient 25 Drive means
26 Controller
27 Insertion opening

The invention claimed is:

1. An attachable container (3, 4, 5) for placement onto a preparation vessel (2) of a food processor (1), wherein a floor-side opening (12) of the attachable container (3, 4, 5) lies vertically above an upper opening (7) of the preparation vessel (2), comprising closure means (13) formed in the attachable container (3, 4, 5) itself and otherwise movable relative to the attachable container (3, 4, 5), which close the floor-side opening (12) in a closed position and can be moved to an open position so as to fill ingredients (23, 24) stored in the attachable container (3, 4, 5) into the preparation vessel (2), wherein a side wall of the attachable container has a cavity with a temperature control device incorporated therein, wherein the attachable container has a display element configured for an optically recordable display of an operating state of the attachable container, and wherein the display element is attached to the attachable container.

2. The attachable container (3, 4, 5) according to claim 1, wherein the closure means (13) can be mechanically activated, and are provided for automatically filling the ingredients (23, 24), and/or that electromechanical drive means (25) are provided, with which the closure means (13) can be moved from the closed position into the open position.

3. The attachable container (3, 4, 5) according to claim 2, wherein the electromechanical drive means (25) is configured to be connected with a controller (26) of the food processor (1) via a hardwired or wireless signal transmission path.

4. The attachable container (3, 4, 5) according to claim 1, comprising an upper opening (8), which can be closed by a cover (6) or an additional attachable container (4, 5).

5. The attachable container (3, 4, 5) according to claim 1, comprising mechanical connecting means (20, 21) configured for mechanically connecting additional attachable containers (3, 4, 5) arranged one directly above the other.

6. The attachable container (3, 4, 5) according to claim 1, wherein an upper side of the attachable container (3, 4, 5) has a first interface element (14) and/or an underside of the attachable container (3, 4, 5) has a second interface element (15), which are designed and arranged in such a way one interface element of the attachable container is connectable to one interface element of another container arranged one above the other.

7. The attachable container (3, 4, 5) according to claim 1, comprising an electrical supply line for transmitting power and/or transmitting signals from the food processor (1) to the attachable container (3, 4, 5).

8. The attachable container (3, 4, 5) according to claim 1 in combination with and further comprising the food processor (1) and preparation vessel (2).

9. A method for operating a food processor (1) having a preparation vessel and a at least one attachable container arranged so that a floor-side opening (12) of the attachable container (3, 4, 5) lies vertically above an upper opening (7) of the preparation vessel (2), comprising closure means (13) formed in the attachable container (3, 4, 5) itself and otherwise movable relative to the attachable container (3, 4, 5), which close the floor-side opening (12) in a closed position and can be moved to an open position, comprising storing ingredients (23, 24) in the at least one attachable container (3, 4, 5) arranged above the preparation vessel (2), and opening the closure means (13) with a controller, causing these ingredients to fall out of the at least one attachable container (3, 4, 5) into the preparation vessel (2) at a prescribed time, controlling a temperature of a side wall of the attached container with a temperature control device, and displaying an operating state of the attachable container in an optically recordable manner with a display element attached to the attachable container.

10. The method according to claim 9, wherein several attachable containers (3, 4, 5) each having closure means are arranged one above the other, which each store ingredients (23, 24), wherein the closure means (13) are opened one after the other in ascending sequence beginning with the lowermost attachable container (3), so that the ingredients (23, 24) fall into the preparation vessel (2), wherein the ingredients (24) fall out of an upper attachable container (4) of the several attachable containers arranged above a lower attachable container (3) of the several attachable containers through the lower attachable container (3) and its open floor-side opening (12).

* * * * *